US012596901B2

(12) United States Patent
Iino et al.

(10) Patent No.: US 12,596,901 B2
(45) Date of Patent: Apr. 7, 2026

(54) OPTICAL STRUCTURE, MANUFACTURING METHOD THEREOF, AND CODE FORMING METHOD

(71) Applicant: TOPPAN Holdings Inc., Tokyo (JP)

(72) Inventors: Terumine Iino, Tokyo (JP); Tomomi Kawahara, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/671,406

(22) Filed: May 22, 2024

(65) Prior Publication Data

US 2024/0330635 A1 Oct. 3, 2024

Related U.S. Application Data

(63) Continuation of application No. PCT/JP2022/044598, filed on Dec. 2, 2022.

(30) Foreign Application Priority Data

Dec. 7, 2021 (JP) ................................. 2021-198412

(51) Int. Cl.
*G06K 7/10* (2006.01)
*B42D 25/23* (2014.01)
*G06K 19/06* (2006.01)

(52) U.S. Cl.
CPC ....... *G06K 19/06028* (2013.01); *B42D 25/23* (2014.10); *G06K 19/06103* (2013.01)

(58) Field of Classification Search
CPC ........... G06K 19/06028; G06K 7/1417; G06K 19/10; G06K 19/06103; G06K 7/1413;
(Continued)

(56) References Cited

U.S. PATENT DOCUMENTS 5,176,972 A * 1/1993 Bloom ..................... G03C 8/52
430/14
5,296,446 A * 3/1994 Fujimura ................. B41M 5/52
503/227
(Continued)

FOREIGN PATENT DOCUMENTS

JP 58-45071 3/1983
JP 2002-192867 7/2002
(Continued)

OTHER PUBLICATIONS

International Search Report issued in International Application No. PCT/JP2022/044598 dated Feb. 21, 2023.
(Continued)

*Primary Examiner* — Daniel St Cyr
(74) *Attorney, Agent, or Firm* — STAAS & HALSEY LLP

(57) ABSTRACT

There is provided an optical structure that can form a code that is difficult to counterfeit and compatibly has both a high readability and a fine appearance. The optical structure of the present invention includes a reflecting layer having regular reflectivity, and a print layer stacked on at least a part of the reflecting layer, the print layer functioning as a scattering reflector having scattering reflectivity, wherein an image part, which is recognizable when viewed from a stack direction, is formed on the print layer, and the image part includes a pale-color level area that is printed, and a non-pale-color level area interposed between the pale-color level areas.

9 Claims, 10 Drawing Sheets

(58) Field of Classification Search
CPC .... G06K 15/023; B42D 25/425; B42D 25/23;
B42D 25/30; B42D 25/405
USPC ........................................................ 235/454
See application file for complete search history.

(56) References Cited

U.S. PATENT DOCUMENTS

| | | | |
|---|---|---|---|
| 6,019,287 A | 2/2000 | Mann | |
| 6,879,096 B1 * | 4/2005 | Miyazaki | H04N 5/70 |
| | | | 313/422 |
| 10,948,876 B2 | 3/2021 | Kagotani | |
| 2003/0205895 A1 | 11/2003 | Scarbrough et al. | |
| 2005/0243391 A1 * | 11/2005 | Drinkwater | B42D 15/025 |
| | | | 359/31 |
| 2007/0058260 A1 * | 3/2007 | Steenblik | B42D 25/378 |
| | | | 359/626 |
| 2008/0090726 A1 * | 4/2008 | Eskra | B41M 5/385 |
| | | | 503/207 |
| 2019/0094802 A1 | 3/2019 | Kagotani | |

FOREIGN PATENT DOCUMENTS

| | | |
|---|---|---|
| JP | 2006-151434 | 6/2006 |
| JP | 2006-160356 | 6/2006 |
| JP | 2009-187209 | 8/2009 |
| JP | 2010-26665 | 2/2010 |
| JP | 2017-87679 | 5/2017 |
| WO | WO 2017/209113 A1 | 12/2017 |

OTHER PUBLICATIONS

Written Opinion issued in International Application No. PCT/JP2022/044598 dated Feb. 21, 2023.
English Translation of IPRP (PCT/IB/338 and PCT/IB/373) (Jun. 20, 2024 and Jun. 5, 2024) and the Written Opinion of ISA (PCT/ISA/237) issued in counterpart International Application No. PCT/JP2022/044598 on Feb. 21, 2023 (10 pages).
Extended European Search Report issued in counterpart European Application No. 22904169.4 dated Mar. 17, 2025.

* cited by examiner

1
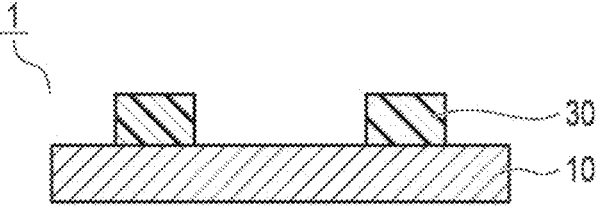
F I G. 1
2
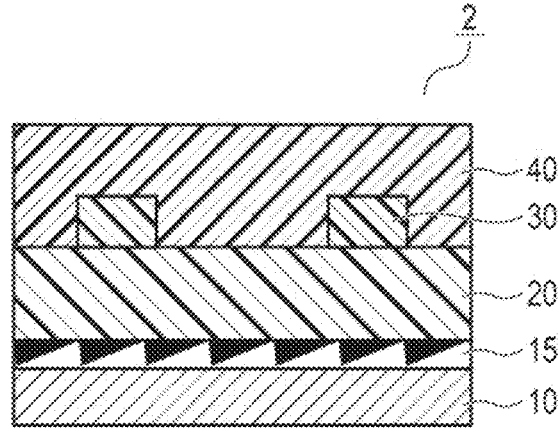
F I G. 2

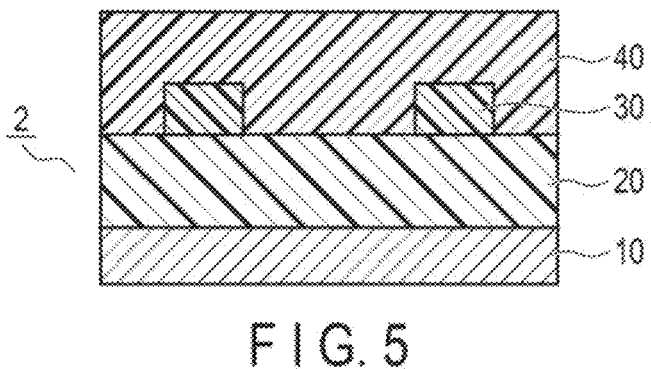
F I G. 5
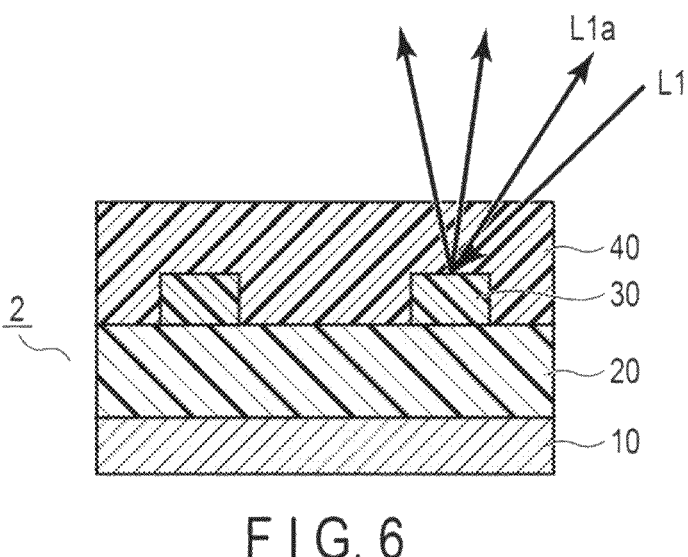
F I G. 6
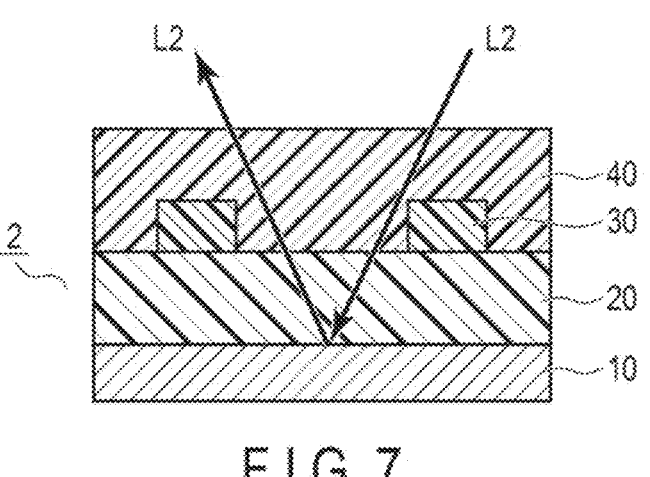
F I G. 7

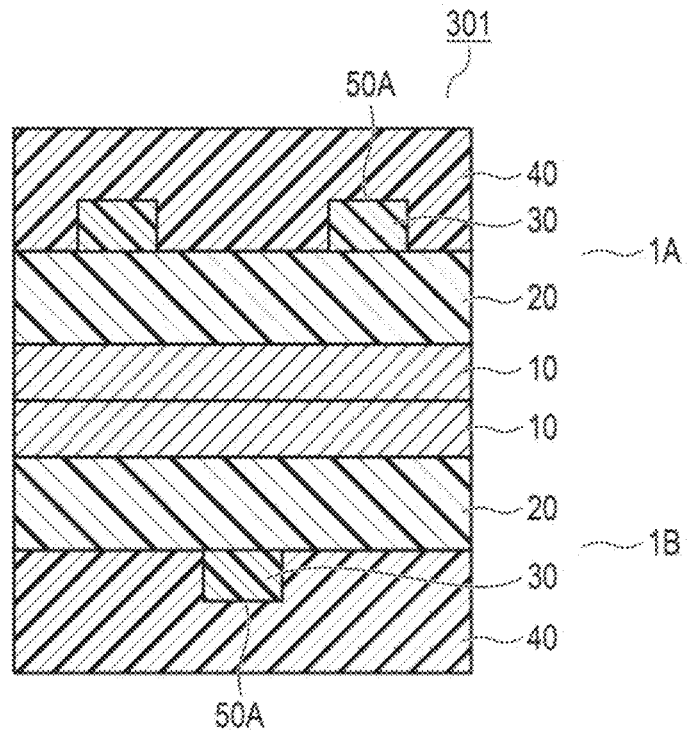
F I G. 15

OPTICAL STRUCTURE, MANUFACTURING METHOD THEREOF, AND CODE FORMING METHOD

CROSS REFERENCE TO RELATED APPLICATIONS

This application is a Continuation Application of PCT Application No. PCT/JP2022/044598, filed Dec. 2, 2022, and based upon and claiming the benefit of priority from prior Japanese Patent Application NO. 2021-198412, filed Dec. 7, 2021, the entire contents of all of which are incorporated herein by reference.

TECHNICAL FIELD

Embodiments of the present invention relate to an optical structure, a manufacturing method thereof, and a forming method of a code such as a bar code.

BACKGROUND ART

At present, a bar code or a two-dimensional code is printed on an object and is widely used. Recently, identification by a smartphone using a two-dimensional code has begun to gain in popularity.

A pattern of a bar code is displayed not only on paper but also on various screens such as a liquid crystal screen or glass, and a code is read by a machine and utilized. In addition, if a decoration or the like can be applied to a target object, the convenience in operation and the external appearance of the target object are improved.

Thus, Jpn. Pat. Appln. KOKAI Publication No. 2002-192867 proposes a method in which an optical diffraction effect is included in a code.

SUMMARY OF INVENTION

However, in the conventional art, a layer structure of an optical element is limited, and a code is formed of a metal. Thus, since the external appearance is poor, and black is used for the code, there is a problem that the code cannot be read from a glossy surface.

Furthermore, since a bar code or a two-dimensional code by a white-and-black print can easily be printed out by a printer by anyone, a counterfeit can easily be made, while the convenience is high. In addition, since the counterfeited code is not different from a genuine code and is printed on white paper in black, there is a case in which it is difficult to determine whether or not to be a counterfeit.

Taking the above circumstances into account, a first object of the present invention is to provide an optical structure that can form a code that is difficult to counterfeit and compatibly has both a high readability and a fine appearance, and a manufacturing method thereof.

In addition, a second object of the present invention is to provide an optical structure on which a code that is readable from even a glossy surface is provided, and a code forming method.

In order to achieve the first object, a first aspect of the present invention is an optical structure including a reflecting layer having regular reflectivity, and a print layer stacked on at least a part of the reflecting layer, the print layer functioning as a scattering reflector having scattering reflectivity, wherein an image part, which is recognizable when viewed from a stack direction, is formed on the print layer, and the image part includes a pale-color level area that is printed, and a non-pale-color level area interposed between the pale-color level areas.

In order to achieve the first object, a second aspect of the present invention is an optical structure of the first aspect, further including a spacer layer having light-transmissivity or transparency between the print layer and the reflecting layer.

In order to achieve the first object, a third aspect of the present invention is an optical structure of the first aspect, further including a protection layer having light-transmissivity or transparency, the protection layer covering the print layer.

In order to achieve the first object, a fourth aspect of the present invention is an optical structure of the second aspect, further including an emboss layer including a recess-and-projection structure, between the spacer layer and the reflecting layer, or between the spacer layer and the print layer.

In order to achieve the first object, a fifth aspect of the present invention is an optical structure including a first optical structure that is the optical structure of the second aspect, and a second optical structure that is the optical structure of the second aspect, wherein the reflecting layer of the first optical structure and the reflecting layer of the second optical structure are bonded.

In order to achieve the first object, a sixth aspect of the present invention is an optical structure including a first optical structure that is the optical structure of the fourth aspect, and a second optical structure that is the optical structure of the fourth aspect, wherein the reflecting layer of the first optical structure and the reflecting layer of the second optical structure are bonded.

In order to achieve the first object, a seventh aspect of the present invention is an optical structure of the first aspect, the non-pale-color level area is a black level area.

In order to achieve the first object, an eighth aspect of the present invention is an optical structure of the fifth aspect, the non-pale-color level area is a black level area.

In order to achieve the first object, a ninth aspect of the present invention is an optical structure of the sixth aspect, the non-pale-color level area is a black level area.

In order to achieve the second object, a tenth aspect of the present invention is an optical structure including a reflecting layer having regular reflectivity, and a plurality of pale-color level areas that are printed, the pale-color level areas being disposed on at least a part of the reflecting layer, wherein a machine-readable code formed by a combination of the pale-color level areas is disposed.

In order to achieve the first or second object, an eleventh aspect of the present invention is an optical structure of the first aspect, the reflecting layer is a mirror-surface layer.

In order to achieve the first or second object, a twelfth aspect of the present invention is an optical structure of the eleventh aspect, the reflecting layer is an evaporation layer.

In order to achieve the first or second object, a thirteenth aspect of the present invention is an optical structure of the first aspect, the pale-color level area is a white level area.

In order to achieve the first object, an fourteenth aspect of the present invention is a manufacturing method of manufacturing an optical structure by preparing a reflecting layer that regularly reflects incident light, stacking a spacer layer having light-transmissivity or transparency on the reflecting layer, stacking, on at least a part of the spacer layer, a print layer including an image part including a machine-readable code formed by a pale-color level area that is a printed part, and a non-pale-color level area interposed between the pale-color level areas, and covering the spacer layer and the print layer with a protection layer.

In order to achieve the second object, a fifteenth aspect of the present invention is a code forming method of forming a machine-readable code by utilizing a ground color of a product and a color of a background of a label covering the product. The method includes forming a plurality of pale-color level areas with one of the ground color and the color of the background, forming a plurality of non-pale-color level areas with the other of the ground color and the color of the background, and forming the machine-readable code by a combination of the pale-color level areas.

According to the present invention, there can be provided an optical structure that can form a code that is difficult to counterfeit and compatibly has both a high readability and a fine appearance, and a manufacturing method thereof. In addition, according to the present invention, there can be provided an optical structure on which a code that is readable from even a glossy surface is provided, and a code forming method.

BRIEF DESCRIPTION OF DRAWINGS

FIG. 1 is a cross-sectional view for conceptually describing a configuration of an optical structure according to a first embodiment of the present invention.

FIG. 2 is a cross-sectional view for conceptually describing a configuration of an optical structure according to a second embodiment of the present invention.

FIG. 5 is a cross-sectional view for describing a step at a time of manufacturing the optical structure according to the second embodiment of the present invention.

FIG. 6 is a view for describing a behavior of light that is incident on the optical structure.

FIG. 7 is a view for describing a behavior of light that is incident on the optical structure.

FIG. 15 is a cross-sectional view for conceptually describing a configuration of an optical structure according to a modification of the present invention.

DESCRIPTION OF EMBODIMENTS

Figure 3:
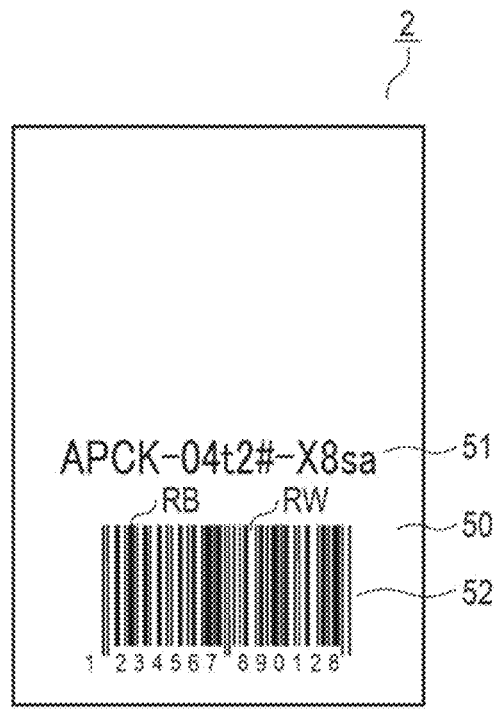
FIG. 3 is a plan view for conceptually describing the optical structure according to the second embodiment of the present invention.

The embodiments of the present invention are a group of embodiments based on a unique single invention from the background. In addition, the aspects of the present invention are modes of the group of embodiments based on the single invention. The structures of the present invention may include the modes of the present disclosure. The features of the present invention can be combined, and can constitute each structure. Accordingly, the features of the present invention, the structures of the present invention, the aspects of the present disclosure, and the embodiments of the present invention can be combined, and the combination has a synergistic function and can exhibit a synergistic effect.

First Embodiment

Hereinafter, a first embodiment of the present invention is described with reference to FIG. 1.

FIG. 1 is a view for conceptually describing a configuration of an optical structure 1 according to the first embodiment of the present invention.

Specifically, the optical structure 1 is formed such that a print layer 30 functioning as a scattering reflector having scattering reflectivity is stacked on a part of a reflecting layer 10 having regular reflectivity. The print layer 30 includes a print area and a non-print area. The print area includes an underlying print. In particular, as regards the print area of a code, it is preferable that a white level of the code is formed in the underlying print.

It is preferable that the underlying print is printed with a white or pale-color opaque ink. The underlying print can be a foundation of a print of a white level of a code, and a single element of a design, a pattern, a logo, a heraldic device, a motif of nature, a geometric pattern, an emblem, a heraldic device, or text of a commodity, or a combination thereof.

The same ink can be used for the underlying print of the print of the single element of a design, a pattern, a logo, a heraldic device, a motif of nature, a geometric pattern, an emblem, a heraldic device, or text of a commodity, or a combination thereof, and for the print of the white level of the code. It is preferable that the white level is 50 or more of L* of the LAB color system in a 2-degree view field at a time of measurement by an SCE method.

(Definition of Directions)

In the present embodiment, a direction in which the print layer 30 and reflecting layer 10 are stacked (i.e., an up-and-down direction in FIG. 1) is referred to as a stack direction. In addition, a side on which the print layer 30 is formed with respect to the reflecting layer 10 (an upper side on the sheet of FIG. 1) is referred to as an upper side, and the opposite side (a lower side on the sheet of FIG. 1) is referred to as a lower side. Viewing from the stack direction is referred to as plan viewing, and viewing in cross section along the stack direction is referred to as cross-sectional viewing.

An image part, which is visually recognizable when viewed from the stack direction, may be formed on the print layer 30. The image part may enable, by the image thereof, visual verification of the genuineness of the optical structure 1. In other words, the image formed on the print layer 30 can be authenticated.

The print layer 30 has such scattering reflectivity as to isotropically reflect incident light on a reflecting surface. Typical scattering reflection is Lambert reflection. Besides, the print layer 30 may have regular reflectivity. In addition, the print layer 30 may be formed of a scattering reflector. The print layer 30 may be formed of a plurality of layers, in particular, two layers. In a case where the print layer 30 is formed of two layers, the two layers may be in direct contact with each other, or may be stacked via a resin. As illustrated in FIG. 15 to be described later, in a case where two print layers 30 are disposed on both upper and lower surfaces of the reflecting layer 10, different images can be formed on the two print layers 30. Thereby, the optical structure 1 can be configured such that different images are observed on the front and back sides, when viewed from the stack direction.

As an image, an identifier of a bar code or a two-dimensional code can be formed on the print layer 30. The image can be formed by a print area and a non-print area. In the print area, a plurality of bar codes or two-dimensional codes can record digital data as codes. The digital data can be recorded as a code. Examples of the code are a bar code and a two-dimensional code. An example of the two-dimensional code is a QR code (trademark). The identifier, in the plan viewing, includes a white level area of the print layer 30, which is a printed part, and a black level area interposed between white level areas. The formed identifier can be authenticated by using a bar code reader.

The image formed on the print layer 30 can be visually perceived. Thereby, a counterfeiting/falsification prevention property and a fine appearance can be improved. The above-described image may include a plurality of image parts. The image parts can display an image as a single element or as an integration of image parts.

The image can be a single element of a portrait, a motif of a landmark, art, a motif of nature, a geometrical pattern, a sign, a symbol, an emblem, a heraldic device, or text, or a combination thereof. The symbol and emblem can be motifs of a flag, a shield, a sword, a lance, a crown, a star, the moon, a heart, a logo, a ribbon, a line, a flower, a leaf, a grain, a fruit, a bird, a wing, fish, an arthropod, a mammal, a reptile, an Amphibia, a fabulous creature, a mythical god, and a mythical goddess.

The landmark can be a heritage, ruins, a historical architecture, a mountain, a valley, a rock, and a monument. The nature can be a creature, a star, the moon, the sky, a mountain, a valley, and a rock. The creature can be a flower, a leaf, a grain, a fruit, a bird, a wing, fish, an arthropod, a mammal, a reptile, and an Amphibia. The fabulous creature can be a unicorn, a dragon, and a phoenix. These motifs can express symbols.

The symbols can express a country, a region, a state, a group, a council, a treaty, an alliance, a union, and an axis.

In the present specification, in the optical structure 1, a first area can be formed on the print layer 30. An outer shape of the first area at a time when the optical structure 1 is observed in the stack direction can be an intended shape. The intended shape can be a shape for verifying the genuineness of the optical structure 1, or a shape for identifying the optical structure 1.

In other words, the intended shape can be authenticated. In addition, the intended shape can be identified. The intended shape can have a size that can be visually recognized by the naked eye, or a size that can be visually recognized by a microscope. The intended shape can be observed by illuminating the optical structure 1 from the observer side.

The reflecting layer 10 is a surface that anisotropically reflects incident light on a reflecting surface. For example, the reflecting layer 10 is a sheet on which a metal is evaporation-deposited. In addition, the reflecting layer 10 may be formed of a reflector.

Note that the optical structure 1 may include light-transmissive layers between the layers constituting the optical structure 1. Each of the light-transmissive layers between the layers may be an adhesive layer that attaches the layers on both sides thereof.

A main component of the reflecting layer 10 can be an inorganic substance, an organic substance, or a mixture thereof. The inorganic substance can be a metal, a metallic compound, or silicon oxide (glass). Examples of the metal are aluminum, silver, tin, chromium, nickel, copper, and gold.

Examples of the metallic compound are titanium oxide, aluminum oxide, and zinc sulfide. Metallic compounds generally have a high refractive index. The organic substance can be an electrically conductive polymer. Examples of the electrically conductive polymer are polyacetylene, polyethylenedioxythiophene (PEDOT).

In addition, in a case of printing a bar code on the print layer 30 and forming a black level area where reading by a bar code reader does not occur, a layer is desirable which satisfies either or both of a condition of anisotropically reflecting incident light on the reflecting surface, and a condition of having a retroreflectance of incident light that is 20% or less.

The reflecting layer 10 can be formed by deposition or printing. As the deposition, physical deposition or chemical deposition (CVD) is applicable. Alternatively, an aluminum foil may be formed. The thickness of the aluminum foil can be 6 µm or more and 100 µm or less. As a packaging material, 6 µm or more, and less than 15 µm, is preferable, and as a sealing material, 15 µm or more, and less than 50 µm, is preferable, and as a tray, 50 µm or more and 100 µm or less is preferable. The aluminum foil can be manufactured by thinly extending an aluminum plate by rolling. In addition, a surface of the aluminum foil may be coated with a transparent resin. The transparent resin coated on the aluminum foil can be a spacer layer 20.

The glossiness of the reflecting layer 10 by 60° measurement can be 40 or more. If the glossiness is high, the retroreflectance of incident light can easily be set at 20% or less at a time of reading the code by a reader. Even if the reflectance is low, the code can be read by the reader, but the glossiness of the reflecting layer 10 lowers.

The physical deposition may be vacuum evaporation, or sputtering. The reflecting layer 10 of the physical deposition can be a metal. A metal of a target in the physical deposition may be various metal targets with a purity of 4N or more. The material of the reflecting layer 10 of the physical deposition can be aluminum, silver, gold, and copper. In addition, the reflecting layer of the physical deposition can be a single layer or a multilayer.

As the ink at a time of forming by printing, use can be made of an offset ink, silkscreen, a letterpress ink, a gravure ink, or the like, in accordance with a printing method.

The ink can be a resin ink, an oil-based ink, an aqueous ink, or the like. In addition, in accordance with a difference of a drying method, for example, the ink can be an oxidation polymerization type ink, a penetration drying type ink, an evaporation drying type ink, an ultraviolet curing type ink, or the like.

The ink can be a pigment ink, a dye ink, or a mixture thereof. An example of the pigment ink is an inorganic pigment ink. The inorganic pigment ink may be a magnetic ink. The magnetic ink can form a pattern by magnetism. Since this pattern is peculiar, the difficulty in counterfeiting can easily be enhanced.

An example of the dye ink is a liquid crystal ink. An example of the liquid crystal ink is a cholesteric liquid crystal ink. The cholesteric liquid crystal reflects light of a specific wavelength. It thus becomes a colored reflecting layer. In addition, the reflectance varies in accordance with a rotating direction of circular polarization and elliptical polarization. Besides, as the reflecting layer, use may be made of a functional ink with a color varying in accordance with an illumination angle or an observation angle.

Examples of such a functional ink are an optical variable ink, a color shift ink, and a pearl ink.

The scattering reflector of the print layer 30 scatters and reflects incident visible light. A main component of the scattering reflector can be an inorganic material. The inorganic material can be a white pigment, a colored material, or a functional ink. The white pigment can be a metal oxide, a metal compound, or silicon oxide. In addition, the inorganic pigment may be mixed with an organic dye such as an azo dye, anthraquinone dye, indigo dye, sulfide dye, or carbonium dye.

Examples of the metal oxide are titanium oxide, zinc oxide, and lead oxide.

Examples of the metal compound are barium sulfate, zinc sulfide, cadmium sulfide (cadmium yellow), zinc chromate, and the like. Metallic compounds generally have a high refractive index. The colored material is a material exhibiting a color of a visible region, and includes a pigment, a dye, or the like. The functional ink is a functional ink with a color varying in accordance with an illumination angle or an observation angle, and includes an optical variable ink, a color shift ink, and a pearl ink.

The print layer 30 can be formed by printing. The printing can be gravure printing or screen printing. In addition, the printing may be ink jet printing. Besides, the printing may be sublimation transfer printing or thermal transfer printing. This printing is particularly preferable as an underlying print. In addition, in a case of printing on a curved surface, pad printing is applicable. Besides, offset print or flexography may be applied.

The number of lines of the screen of screen printing of an underlying print can be, for example, 100 or more, or 400, or, preferably, 200 to 350. The line speed at this time can be, for example, 5 to 100 m/min. The number of lines in gravure printing can be, for example, 100 to 500. The line speed at this time can be, for example, 50 to 500 m/min.

The viscosity of the ink can be, for example, 100 cp or more, and 2000 cp or less. This viscosity can be measured by a kinematic viscosity meter. The solid content ratio can be 10 or more and 30 or less, and may further be 15 or more and 25 or less, as a weight ratio between the ink including a solvent, and a total amount of the medium and pigment of the ink, and the ratio between the pigment and the medium of the underlying print can be 1:3.75 or more, and 1:6.25 or less.

The thickness of the single-layer print layer 30 is preferably 700 nm or more and 500 μm or less.

The ink at a time of forming the print layer 30 by printing can be an offset ink, silkscreen, a letterpress ink, an intaglio ink, a gravure ink, or the like, in accordance with a printing method. The ink can be a resin ink, an oil-based ink, an aqueous ink, or the like.

In addition, in accordance with a difference of a drying method, for example, the ink can be an oxidation polymerization type ink, a penetration drying type ink, an evaporation drying type ink, an ultraviolet curing type ink, and the like. The ink can be a pigment ink, a dye ink, or a mixture thereof.

An example of the pigment ink can be a magnetic ink. The magnetic ink can form a pattern by magnetism. Since this pattern is peculiar, the difficulty in counterfeiting can easily be enhanced.

Examples of the dye ink are an infrared light emission ink, an ultraviolet light emission ink, and a liquid crystal ink. An example of the liquid crystal ink is a cholesteric liquid crystal ink. The cholesteric liquid crystal reflects light of a specific wavelength. It thus becomes a colored reflecting layer.

In addition, the reflectance varies in accordance with a rotating direction of circular polarization and elliptical polarization. Besides, as the reflecting layer, use may be made of a functional ink with a color varying in accordance with an illumination angle or an observation angle. Examples of such a functional ink are an optical variable ink, a color shift ink, and a pearl ink.

The print layer 30 forms an identifier including a machine-readable code. The machine-readable code may be a bar code that can be read by a bar code reader.

The thickness of the print layer 30 that forms a bar code is preferably 1 μm or more and 500 μm or less. It is preferable that the area ratio of a print area as a scattering reflector in the print layer 30 forming a white-level section of a code is 65% to 100%. If the area ratio 65%, reflection of incident light dominantly occurs, compared to transmission of the incident light. The print area of the underlying print can be a scattering reflector. The print layer 30 can be a layer of an underlying print. The underlying print layer is usually a single layer.

As regards the glossiness of the underlying print, a print of a single element of a design, a pattern, a logo, a heraldic device, a motif of nature, a geometric pattern, an emblem, a heraldic device, or text of a commodity, or a combination thereof, may be printed on the underlying print with a black, gray, or colored ink. In addition, these prints may be covered with a transparent varnish as an outermost layer covering the prints.

Further, if the thickness of the print layer 30 is 1 μm or more, the retroreflectance of incident light can meet a condition of 80% or less and 40% or more. Thereby, a contrast of white and black can clearly be obtained, and authentication becomes possible.

The thickness of the print layer 30 in the case where the print layer 30 is two layers is preferably 2 μm or more and 1 mm or less. The two layers of the print layer 30 can be mutually different prints or deposits. In addition, one of the two layers of the print layer 30 can be a printed matter, and the other can be a deposit.

The print layer 30 may partly be removed by chemical etching. In other words, the print layer 30 may be partly formed.

The print layer 30 may partly be removed by a laser.

Additionally, in the case where the print layer 30 includes two layers and is partly formed, the outer shapes of scattering reflections of scattering reflectors included in the print layer 30 of the two layers may overlap. In this case, at a time of transmissive observation, the print layer 30 displays an image by the outer shapes of the scattering reflecting layers of the two layers.

By partly removing the print layer 30, the fine appearance can be improved. An intended outer shape of the partly formed print layer 30 can be a security motif. The security motif can be an authentication motif or a verification motif.

The security motif can be a line drawing, a geometric pattern, text, and calligraphy. An example of the geometric pattern is a guilloche.

An example of the text is microtext. Examples of the calligraphy are Western calligraphy, Islamic calligraphy, Georgian calligraphy, Chinese calligraphy, Japanese calligraphy, Korean calligraphy, Philippine Suyat, Thai calligraphy, Indian Oriya characters, and Nepali calligraphy.

As described above, according to the present embodiment, there can be provided an optical structure that can form a code that is difficult to counterfeit and compatibly has both a high readability and a fine appearance.

Second Embodiment

A second embodiment of the present invention is described with reference to FIG. 2 to FIG. 7. In the description below, structures common to those already described are denoted by identical reference signs, and an overlapping description is omitted.

FIG. 2 is a cross-sectional view for conceptually describing a configuration of an optical structure 2 according to the second embodiment of the present invention. Specifically, the optical structure 2 is configured such that a reflecting layer 10, an emboss layer 15, a spacer layer 20, a print layer 30, and a protection layer 40 are stacked in order.

The emboss layer 15 may form a relief structure. A surface having the relief structure can be a relief surface.

In addition, the emboss layer 15 having the relief structure can be disposed between the spacer layer 20 and the print layer 30.

The relief structure is formed in a shape of a recess-and-projection structure. The relief structure may be formed by transferring (embossing) a relief structure of a recess-and-projection shape, which is formed on a surface of a metal stamper, onto a target object.

The relief structure has optical effects such as an optical diffraction effect, a nonreflection effect, an isotropic or anisotropic scattering effect, a lens effect, and a polarization selective reflection effect. By the optical effects, the genuineness can be visually verified. In other words, the relief structure is visible.

In addition, the relief structure can be visually authenticated. The print layer 30 on the relief surface having the relief structure is also visible and can be authenticated. In other words, the genuineness of the the print layer 30 on the relief surface having the relief structure can also be visually verified.

Thereby, a counterfeiting/falsification prevention effect is exhibited. In addition, by the optical effects, a fine appearance can be imparted. In other words, by the optical effects, the optical structure can have a visual effect.

By combining relief structures having one or plural optical effects, a target optical effect may be obtained. Areas having respective optical effects may be disposed to be in contact with each other, to neighbor each other, or to be close to each other, or disposed at regular intervals or alternately.

In this manner, since the relief surface having the relief structure with the optical effects can exhibit a complex visual effect, the relief surface is effective in preventing counterfeiting and falsification. In addition, the fine appearance of the optical structure 2 can be improved.

The relief structure includes recess portions and projection portions, and imparts to the optical structure 2 optical properties such as diffraction, light reflection suppression, isotropic or anisotropic light scattering, refraction, and polarization/wavelength selective reflection, transmission and light reflection suppression.

As the relief structure, an area of a diffraction grating structure may be provided, for example, with a pitch of 0.5 μm or more and 2 μm or less, and a depth of 0.05 μm or more and 0.5 μm or less. Thereby, the relief structure imparts a property of diffracting light to the optical structure 2.

As the relief structure, a moth-eye structure or a deep grating structure may be provided, for example, with a pitch of 0.1 μm or more and 0.5 μm or less, and a depth of 0.25 μm or more and 0.75 μm or less. In this case, the relief structure imparts properties of light reflection suppression, and polarization/wavelength selective reflection, transmission and light reflection suppression to the optical structure 2.

As the relief structure, an area of an aperiodic line-shaped or dot-shaped repetitive structure may be provided, for example, with an average pitch of 0.5 μm or more and 3 μm or less, and a depth of 0.05 μm or more and 0.5 μm or less. Thereby, the relief structure imparts a property of emitting isotropic or anisotropic scattering light to the optical structure 2.

As the relief structure, an area of a structure with an average pitch greater than 3 μm and a depth greater than 0.5 μm may be provided. Thereby, a refractive index different from a refractive index of a neighboring layer can be set, and the relief structure imparts a property of refraction to the optical structure 2.

In addition, the relief structure may include a relief surface (recording surface) disclosed in International Publication No. 2017-209113. Specifically, the relief surface in the present embodiment can include a phase angle recording area and a phase angle non-recording area, like the recording surface disclosed in International Publication No. 2017-209113.

In addition, in the relief surface, an area other than the phase angle recording area becomes the phase angle non-recording area. In one example, the phase angle non-recording area is a mirror surface.

Next, using an XYZ orthogonal coordinate system, the positional relationship between the structures is described. Here, it is assumed that the relief surface is disposed along an XY plane.

If light is incident from a direction crossing a relief surface, the incident light is modulated by the relief surface, and thereby a reproduction image can be obtained. The reproduction image is an image of a plurality of reproduction points. The reproduction point is obtained at a position apart from the relief surface in the Z direction. A range in a viewing angle direction, in which a reproduction image is reproduced in a case of viewing the relief surface from a reproduction point of interest, is called a viewing angle θ. In the description below, the viewing angle direction is the X direction or Y direction.

On the relief surface, a calculation element section is defined in accordance with the viewing angle θ from each reproduction point at which the reproduction image is reproduced. In this manner, since the calculation element section is defined independently from the phase angle recording area and phase angle non-recording area, the calculation element section, in usual cases, overlaps the phase angle recording area and phase angle non-recording area individually.

In addition, a plurality of reproduction points are present. Accordingly, the same number of calculation element sections as the number of reproduction points are present in association with the respective reproduction points.

Additionally, the reproduction points are disposed apart from the relief surface. Preferably, the reproduction point is reproduced at the distance of 5 mm or more and 25 mm or less of the reproduction point from the relief surface in the Z direction. Note that as regards the reproduction point, there are a case where the reproduction point is reproduced from the relief surface to the observer side, and a case where the reproduction point is reproduced on the side of the relief surface opposite to the observer. In each case, the distance of the reproduction point from the relief surface can be similarly defined.

The viewing angle θ from the reproduction point is defined by formula (1) below.

$$\theta < (A/m) \tag{1}$$

Here, in a case of $(\lambda/2d) \le 1$, $A = a \sin (\lambda/2d)$, $\lambda$ is a wavelength of light, d is an arrangement interval in the viewing angle direction of unit blocks, and m is a real number of 3 or more. The wavelength $\lambda$ of light can concretely be set at 555 nm that is a maximum relative luminosity of visible light. The arrangement interval d can be set at an inter-center distance of unit blocks. The arrangement interval of center unit blocks can be 10 nm or more and 200 nm or less.

The viewing angle θ is determined by the range in the X direction in a case where the relief surface is viewed from the reproduction point of interest, and is ½ of an angle 2θ formed by a minimum value Xmin in the X direction, the reproduction point of interest, and a maximum value Xmax in the X direction. Note that the X direction and Y direction correspond to an X coordinate axis and a Y coordinate axis of Euclidian coordinates in which one direction extending in the relief surface is set as the X direction and a direction perpendicular to the X direction is set as the Y direction.

Note that the viewing angle θ in a case where the viewing angle direction is set to be the Y direction is similarly defined. Specifically, the viewing angle θ is determined by the range in the Y direction in a case where the relief surface is viewed from the reproduction point of interest, and is ½ of an angle 2θ formed by a minimum value Ymin in the Y direction, the reproduction point of interest, and a maximum value Ymax in the Y direction. Accordingly, an arrangement interval d of unit blocks corresponds to an arrangement interval dx in the X direction of unit blocks in the case where the viewing angle direction is the X direction, and corresponds to an arrangement interval dy in the Y direction of unit blocks in the case where the viewing angle direction is the Y direction.

Thus, the calculation element section generally becomes a square or a rectangle. However, the calculation element section may be a polygon other than a quadrangle, or a circle, or an ellipse. As regards the polygon, in particular, in addition to the square and rectangle, a hexagon is suitable. In a case where the calculation element section is other than the square or rectangle, the minimum value (lower-limit value) in the X direction of the calculation element section is set as Xmin, and the maximum value (higher-limit value) in the X direction of the calculation element section is set as Xmax. Similarly, the minimum value in the Y direction of the calculation element section is set as Ymin, and the maximum value in the Y direction of the calculation element section is set as Ymax.

In the case where the shape of the unit block is a square or rectangle, the shape becomes, actually, a rounded-corner quadrangle in which corners of a square or rectangle are rounded. In addition, a unit block may merge with a neighboring unit block. In this case, although the shape of each unit block is a rounded-corner quadrangle, the shape of the merged unit block does not become a rounded-corner quadrangle, but is deformed. Even if the shape is deformed by the merging, the optical effect is unchanged.

It is preferable that the unit blocks are orderly arranged. The orderly arrangement can be an arrangement at intervals in a fixed range, or an arrangement at regular intervals. Typical orderly arrangements are a square arrangement and a hexagonal arrangement.

As is understood from the above formula (1), the viewing angle θ is less than A. In a case where light passes through this phase component and is diffracted, a diffraction exceeding A does not occur theoretically. Accordingly, in a case of performing hologram calculation using a computer, it suffices that the calculation range is limited by setting the viewing angle θ as the upper limit. To limit the calculation range in this manner shortens the calculation time.

Additionally, even if calculation is performed for the range exceeding the viewing angle θ, calculation of diffraction that does not theoretically exist is merely performed, and thus the result contributes only as noise. However, in the above-described calculation, since the calculation for the range exceeding the viewing angle θ is not performed, noise is not superimposed at the time of reproducing the reproduction image on the reproduction point.

Each of the phase angle recording area and the phase angle non-recording area includes a plurality of unit blocks. In the phase angle recording area, a unit block included in an area (overlapping area) overlapping the calculation element section is set as a target, the phase angle is calculated by a computer, based on the phase component, and the calculated phase angle is recorded on the corresponding unit block included in the overlapping area.

The relief surface of the present embodiment is visible and can be authenticated. In a case where the optical structure 2 including this relief surface as the relief structure is inclined by a predetermined degree or more and is observed from outside the range of the above-described viewing angle θ, the reproduction image disappears due to the relief structure.

On the other hand, in a case where a visually recognizable image formed on the print layer 30 is a bar code, the bar code is in a state in which the bar code can be read by a bar code reader even under this observation condition (outside the range of the viewing angle θ).

Additionally, the above-described reproduction image is reproduced only with a point light source. Thus, under scattering illumination, the reproduction image disappears. On the other hand, the bar code is in a state in which the code can be read by the bar code reader even under this observation condition (outside the range of the viewing angle θ).

The viewing angle θ is preferably five degrees or more from the standpoint of visibility of the reproduction image, and is preferably 15 degrees or less from the standpoint of making the reproduction point easily disappear.

The optical property of the optical structure 2 can be perceived by visual observation. Thereby, the counterfeiting/falsification prevention property and the fine appearance can be improved. The above-described relief structure may include a plurality of relief structure areas.

The relief structure areas can display an image as a single element or as an integration of relief structure areas. The image can be a single element of a portrait, a motif of a landmark, art, a motif of nature, a geometrical pattern, a sign, a symbol, an emblem, a heraldic device, or text, or a combination thereof.

The symbol and emblem can be motifs of a flag, a shield, a sword, a lance, a crown, a star, the moon, a heart, a logo, a ribbon, a line, a flower, a leaf, a grain, a fruit, a bird, a wing, fish, an arthropod, a mammal, a reptile, an Amphibia, a fabulous creature, a mythical god, and a mythical goddess.

The landmark can be a heritage, ruins, a historical architecture, a mountain, a valley, a rock, and a monument.

The nature can be a creature, a star, the moon, the sky, a mountain, a valley, and a rock. The creature can be a flower, a leaf, a grain, a fruit, a bird, a wing, fish, an arthropod, a mammal, a reptile, and an Amphibia.

The fabulous creature can be a unicorn, a dragon, and a phoenix. These motifs can express symbols. The symbols can express a country, a region, a state, a group, a council, a treaty, an alliance, a union, and an axis.

The protection layer 40 is, for example, a layer including a thermoplastic resin and a surface modifier. The thermoplastic resin of the protection layer 40 may be a resin having a glass transition temperature of 90° C. or more and 130° C. or less.

The thermoplastic resin can be any one of an acrylic resin, a polyester resin and a polyamide resin, or a copolymer resin thereof, or a composite resin thereof, or a composite resin thereof of a copolymer resin thereof.

The surface modifier may be powder, wax, or oil. The powder may be heat-resistant powder. The heat-resistant powder can be silica powder, polyethylene powder, fluorine-based powder, or silicone-based powder.

The wax can be paraffin wax, silicone, or carnauba wax. The oil may be silicone oil.

The emboss layer (not illustrated) includes a relief structure on at least one of surfaces thereof. The emboss layer is formed of, for example, an ultraviolet-curing resin, a thermoplastic resin or a thermosetting resin.

The ultraviolet-curing resin can be a monomer, an oligomer, or a polymer, which is a curing resin and includes an ethylenically unsaturated bond or an ethylenically unsaturated group.

The monomer including the ethylenically unsaturated bond or ethylenically unsaturated group can be 1,6-hexanediol, neopentyl glycol diacrylate, trimethylolpropane triacrylate, pentaerythritol triacrylate, pentaerythritol tetraacrylate, dipentaerythritol pentaacrylate, or dipentaerythritol hexaacrylate.

The oligomer including the ethylenically unsaturated bond or ethylenically unsaturated group can be an oligomer or cooligomer of epoxy acrylate, urethane acrylate, or polyester acrylate.

The polymer can be a polymer or copolymer of a urethane-modified acrylic or epoxy-modified acrylic.

The ultraviolet-curing resin can be any one of an acrylic resin, an acrylacrylate resin, an epoxyacrylate resin, an urethaneacrylate resin, a polyesteracrylate resin, and an ethylenemethacrylate resin, or a copolymer resin thereof, or a composite resin thereof, or a composite resin thereof of a copolymer resin thereof.

The thickness of the emboss layer can be 1 μm or more and 25 μm or less.

In a case where the thermoplastic resin is used as the material of the emboss layer, the thermoplastic resin can be any one of an acrylic resin, an epoxy resin, a cellulose resin, and vinyl resin, or a copolymer resin thereof, or a composite resin thereof, or a composite resin thereof of a copolymer resin thereof.

The thermosetting resin of the emboss layer can be any one of a urethane resin, a melamine resin, an epoxy resin and a phenol resin, or a copolymer resin thereof, or a composite resin thereof, or a composite resin thereof of a copolymer resin thereof. The same material is applicable to the protection layer 40.

The emboss layer may be colored. The emboss layer can be colored by adding a pigment or dye to the resin of the emboss layer. The pigment can be an inorganic pigment or an organic pigment. Alternatively, the pigment can be a fluorescent pigment, a pearl pigment, or a magnetic pigment. The dye can be a natural dye or a synthetic dye. Alternatively, the dye can be a fluorescent dye.

Note that the optical structure 2 may include light-transmissive layers between the layers constituting the optical structure 2. Each of the light-transmissive layers between the layers may be an adhesive layer that attaches the layers on both sides thereof.

The spacer layer 20 has light-transmissivity or transparency. The required light-transmissivity or transparency of the spacer layer 20 may be set at such a level that incident light from the protection layer 40 side can reach the reflecting layer 10 and light reflected by the reflecting layer 10 can transmit. The spacer layer 20 may be colored. The spacer layer 20 may be a layer that transmits a visible or infrared laser beam.

The spacer layer 20 may be configured such that a visible code can be laser-written. The material of the spacer layer 20 may be polycarbonate or polyester, which is heat-resistant at a time of laser write.

In addition, a material with a little degree of a light scattering property can be used for the spacer layer 20. The transmittance in this case may be 40% or more, and preferably 60% or more, in a visible region of wavelengths 380 nm to 780 nm. Besides, typically, the transmittance at a wavelength of 1064 nm of a laser beam is preferably 30% or more.

The material of the spacer layer 20 can be polyolefin, or a polymer including an aryl group. The polyolefin or the polymer including the aryl group is a light-transmissive or transparent polymer.

The polymer including the aryl group can be polycarbonate, or polyester terephthalate. The polyolefin can be one of polyethylene and polypropylene, or denaturated matter thereof, or a copolymer thereof.

Additionally, since the polyolefin has a simple structure of a principal chain and is stable in heat, a chemical change due to a laser beam of the energy of a fixed level or less is small. Thus, even if a laser beam of such energy as to remove the reflecting layer 10 is irradiated, a color change of the spacer layer 20 does not easily occur.

Furthermore, since one of polyethylene and polypropylene, or denaturated matter thereof, or a copolymer thereof is a crystalline polymer, a fixed quantity of heat is necessary for a phase transition at a time of fusion, and thus a change due to irradiation of a laser beam of the energy of fixed level or less is small.

In addition, since an aromatic hydrocarbon of an aryl group becomes a resonance hybrid and is excellent in heat resistance, deformation or the like due to irradiation of a laser beam of such energy as to remove the reflecting layer 10 can easily be suppressed.

On the other hand, since an aromatic hydrocarbon has a large ratio of carbon in a molecule, the aromatic hydrocarbon is easily carbonized, and, in a case where the aromatic hydrocarbon is carbonized with a sufficient heat quantity, black can fully be developed even in a thin layer. Thus, in a case where the polymer including the aryl group is used as the material of the spacer layer 20, if the irradiation energy of the laser beam is sufficiently high, black can be developed by removing the reflecting layer 10 and by carbonizing the spacer layer 20.

Note that the reflecting layer 10 at a part where the spacer layer 20 is carbonized may not be removed. It is also possible that the spacer layer 20 is carbonized and the reflecting layer 10 at the carbonized part is not removed, by separating the focal point of the laser beam from the reflecting layer 10 (50 μm or more, and 350 μm or less, although depending on the irradiation energy or the depth of focus of the laser beam), or by providing the reflecting layer 10 after carbonizing the spacer layer 20.

In this carbonized removal area, while the read by the bar code reader is difficult, visibility is excellent. Thus, a visible code can be recorded. The visible code can be any one of a sign, alphabet, and a numeral, or a string of a combination thereof.

Thereby, it is possible to adapt to both the efficient processing by a bar code reader and the confirmation of a code by visual observation. A visible code in the carbonized removal area can be prevented from falsification by being recorded on a hologram part.

Additionally, the visible code can include part or the entirety of the information of data of a code that is recorded as a bar code. Besides, the correspondence between the visible code and the bar code may be stored in a table of a data server.

Additionally, a code in which data recorded in a bar code is encrypted may be recorded. Besides, in a case where a part of the information of data of the code recorded as the bar code is included, hash can be used. The hash may be a cipher hash.

By the hash, even in a case of a short code, an identifier of the bar code read by a reader and large data can be correlated. Further, by using the encrypted code, genuineness can be verified and data can be hidden.

Additionally, an adhesive layer including an acrylic resin as a main component may be provided adjacent to the spacer layer 20. The acrylic resin has a low heat resistance, but the thermal decomposition thereof is of a depolymerization type. Thus, if the acrylic resin has a fixed molecular weight, the molecular structure remains due to laser beam irradiation, and the capability can be maintained. The molecular weight of the acrylic resin is preferably 100,000 or more.

Additionally, in the case where the molecular weight is large, the glass transition temperature also rises, and thus, if the glass transition temperature is a fixed level or more, the molecular weight is generally large. Thus, in the case of the acrylic resin having the glass transition temperature of 40 degrees or more, the molecular weight is sufficiently large, and, even if the laser beam is irradiated to such a degree as to remove the reflecting layer, the adhesion of the adhesive material can easily be maintained. The thickness of the adhesive layer can be 0.1 μm or more and 10 μm or less.

The material of the spacer layer 20 may be a polymer. If the spacer layer 20 is formed of the same kind of material as the scattering layer, both can easily be bonded as one piece by heat-bonding.

The thickness of the spacer layer 20 is preferably in a range of 20 μm or more and 200 μm or less. If the thickness is 25 μm or more, damage to the reflecting layer 10 can easily be prevented. If the thickness is 200 μm or less, a protrusion of the optical structure 1 at a time of attaching or burying is less easily perceived, and the flexibility of the spacer layer 20 can easily be obtained.

The protection layer 40 has similar light-transmissivity or transparency to the spacer layer 20, protects the plan-view shape of the print layer 30, and keeps a machine-readable state of the above-described code.

The protection layer 40 can be formed of various resins. The resin of the protection layer 40 can be a polycarbonate resin or an acrylic resin. The resin of the protection layer 40 can be a thermoplastic resin or a curing resin. If the protection layer 40 is formed of the same kind of material as the spacer layer 20, all layers can easily be bonded as one piece by heat-bonding.

The difference of softening temperatures between the protection layer 40 and the spacer layer 20 may be within 30° C. Thereby, the respective layers can easily be bonded as one piece by heat-bonding. The thickness of the protection layer 40 is preferably 50 μm or more and 400 μm or less.

FIG. 3 is a plan view for conceptually describing the optical structure according to the second embodiment of the present invention.

The plan view illustrated in FIG. 3 is an example of a plan view in which the optical structure 2 is viewed in the stack direction from the protection layer 40 side.

In this example, a visible code 51 formed by partly carbonizing the spacer layer 20; and a bar code 52 that is formed in the print layer 30 and includes the data of the visible code 51 as a machine-readable code formed by a combination of arrangements of printed white level areas RW and black level areas RB interposed between the white level areas RW, are formed as an individual information record (image information record) 50.

The bar code 52 may include numerals or the like, which indicate an identification code, under a plurality of bars.

In this manner, the identification code can be recorded on the individual information record 50. The optical structure 1 can be a security pass.

Additionally, the print layer 30 may have a fragile structure that is broken at a time of peeling. Thereby, falsification of the optical structure 2 can be made more difficult.

In FIG. 3, the visible code 51 and bar code 52 are formed in a first area of the print layer 30. In addition, in FIG. 3, although the visible code 51 and bar code 52 are formed, only the bar code 52 may be formed.

Additionally, the visible code 51 and bar code 52 can be identification codes. Besides, the identification code of the bar code 52 may be a product code or a serial number.

In this case, the optical structure 1 can be a product tag. Besides, the optical structure 1 may be a gift card.

In this case, the visible code 51 can be a claim code, and the identification code of the bar code 52 can be a serial number. The visible code may be a code recorded by the spacer layer 20 being carbonized by a laser beam.

The recorded individual information can be a biological identifier, a code, personal data, a sign, or a combination thereof. Examples of the biological identifier are a face image, a fingerprint, a sign (signature), a walking action, a vocal print, an iris, and a vein pattern.

Examples of the personal data are a name, a country name, a country code, and an ID number. The optical structure 2 has a rainbow-colored, white, or metallic appearance by reflection. The face image is accompanied with a rainbow-colored, white, or metallic appearance by reflection. The bar code 52 has a rainbow-colored, white, or metallic appearance by reflection.

The rainbow-colored, white, and metallic appearances may be switched in accordance with an observation condition. In addition, the optical structure 2 may include an area where rainbow colors appear, an area where an interference color appears, and an area where metallic gloss appears.

(Manufacturing Method of Optical Structure 2)

Figure 4:
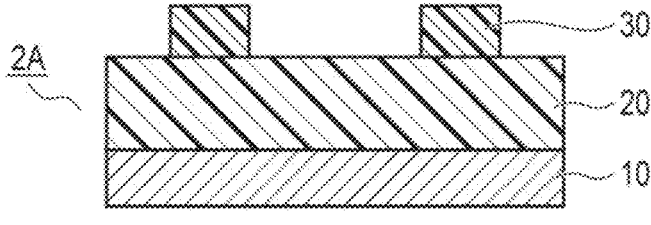
FIG. 4 is a cross-sectional view for describing a step at a time of manufacturing the optical structure according to the second embodiment of the present invention.

Next, referring to FIG. 4 and FIG. 5, a manufacturing method of the optical structure 2 is described.

FIG. 4 and FIG. 5 are cross-sectional views for describing steps at a time of manufacturing the optical structure according to the second embodiment of the present invention.

FIG. 4 illustrates a pre-structure 2A in which the print layer 30 is stacked on the spacer layer 20. For the transfer of the print layer 30, use may be made of thermal transfer, a 3D printer, screen printing, ink jet printing, and gravure printing.

FIG. 5 illustrates the optical structure 2 formed by adhering the protection layer 40 covering the print layer 30 to the pre-structure 2A illustrated in FIG. 4. The adhesion of the protection layer 40 can be carried out by using pressure-bonding by heat, or adhesion using an adhesive layer.

Next, referring to FIG. 6 and FIG. 7, a description is given of a behavior of light radiated on the completed optical structure 2 from the protection layer 40 side.

FIG. 6 is a view for describing a behavior of light incident on the optical structure 2.

FIG. 7 is a view for describing a behavior of light incident on the optical structure 2.

As illustrated in FIG. 6, light L1 radiated on the print layer 30 is scatter-reflected. As a result, part L1a of the incident light is retroreflected and returned in the direction of incidence. On the other hand, as illustrated in FIG. 7, light L2, which is incident on a part where the scattering reflector of the print layer 30 does not exist, passes through the spacer layer 20, reaches the reflecting layer 10, and is regularly reflected. As a result, the light L2, which is incident on the part where the scattering reflector of the print layer 30 does not exist, is mainly reflected in a regular reflection direction that is different from the direction of incidence.

Accordingly, of the light radiated from the bar code reader, light falling on the reflecting layer 10 is not received by the bar code reader, and light falling on the print layer 30 is partly returned to and received by the reader.

Thereby, the reader can detect the area where the print layer 30 exists, as a high signal level area, and can detect the area where the scattering reflector of the print layer 30 does not exist, as a low signal level area.

Thereby, in the visible code 51 or bar code 52 (i.e., the first area), a part corresponding to a white part (an area to be recognized as white by the reader) is distinguished as an area where the print layer 30 exists, and a part corresponding to a black part (an area to be recognized as black by the reader) is distinguished as an area where the print layer 30 does not exist, and thereby the individual information record 50 can be formed.

The individual information record 50 can be made visible by scattering reflection. In addition, the individual information record 50 can be made machine-readable by scattering reflection.

A width of each of the white level area RW and black level area RB in a direction (a depth direction in FIG. 7 and FIG. 8) crossing the longitudinal direction of each of the white level area RW and black level area RB may correspond to record information of the bar code 52.

A standard size of the width of one module that is a record unit of a bar of a bar code is stipulated as being 0.33 mm. In a JAN standard bar code, the width of one module is set at 0.15 times to 2.1 times the standard size, and in JIS X0507, 0.8 times to 2.0 times the standard size is set as a recommendable width.

Accordingly, the width of one module that is the record unit of the bar code 52 is preferably in a range of 33 μm to 700 μm. In other words, a minimum width of the bar of the bar code 52 (a minimum width of each of the white level area RW and black level area RB in a direction crossing the longitudinal direction of each of the white level area RW and black level area RB) can be set at 33 μm or more.

Additionally, a maximum length of the bar code 52 (a maximum value of the length in the longitudinal direction of the white level area RW and black level area RB) is limited mainly by the bar code reader, and, if the maximum length is 10 cm or less, reading is possible by a standard bar code reader.

Additionally, from the standpoint of reducing a read error, the maximum length of the bar code 52 is preferably 6 mm or less.

Additionally, in the first area, a plurality of white level areas RW and a plurality of black level areas RB, each of which is interposed between two neighboring white level areas RW in the X direction, are formed. In this manner, by the alternately arranged white level areas RW and black level areas RB, the bar code 52, in which the data or the like of the owner of the visible code 51 is encoded, can be formed. In addition, a commodity identification code can be recorded on the bar code.

As described above, in the optical structure 2 of the present embodiment, the individual information record 50 can be formed by controlling the print width of the print layer 30. The individual information record 50 is covered by the protection layer 40, and it is difficult to rearrange the material of the print layer 30. In other words, it is difficult to falsify the individual information record 50 recorded on the print layer 30.

As a result, the individual information record 50 of the optical structure 2 has a high difficulty in counterfeiting. Thus, unlike a code printed on paper, the optical structure 2 on which the individual information record 50 is formed has a high security level.

Additionally, the formed individual information record 50 has rainbow colors, a white color, or metallic gloss, and is excellent in fine appearance. Further, the individual information record 50 can be formed as an identifier including a readable code by a difference in reflectivity between the white level area RW and black level area RB. Thus, the optical structure 2 in which the individual information record 50 is formed can eliminate the incompatibility between a high readability and a fine appearance.

In the bar code, a commodity identification code can be recorded as an identifier including a readable code. The commodity identification code can be a JAN code, an EAN code, and a U.P.C. In addition, a QR code can be formed as a two-dimensional code, and a URL can be recorded in the QR code as an identifier including a readable code.

As has been described above, according to the present embodiment, there can be provided an optical structure that can form a code that compatibly has both a high readability by a reader and a fine appearance. In addition, there can be provided an optical structure that is difficult to counterfeit, by using a special process or material for the reflecting layer 10 and the printing.

Third Embodiment

A third embodiment of the present invention is described with reference to FIG. 8 and FIG. 9. In the description below, structures common to those already described are denoted by identical reference signs, and an overlapping description is omitted.

Figure 8:
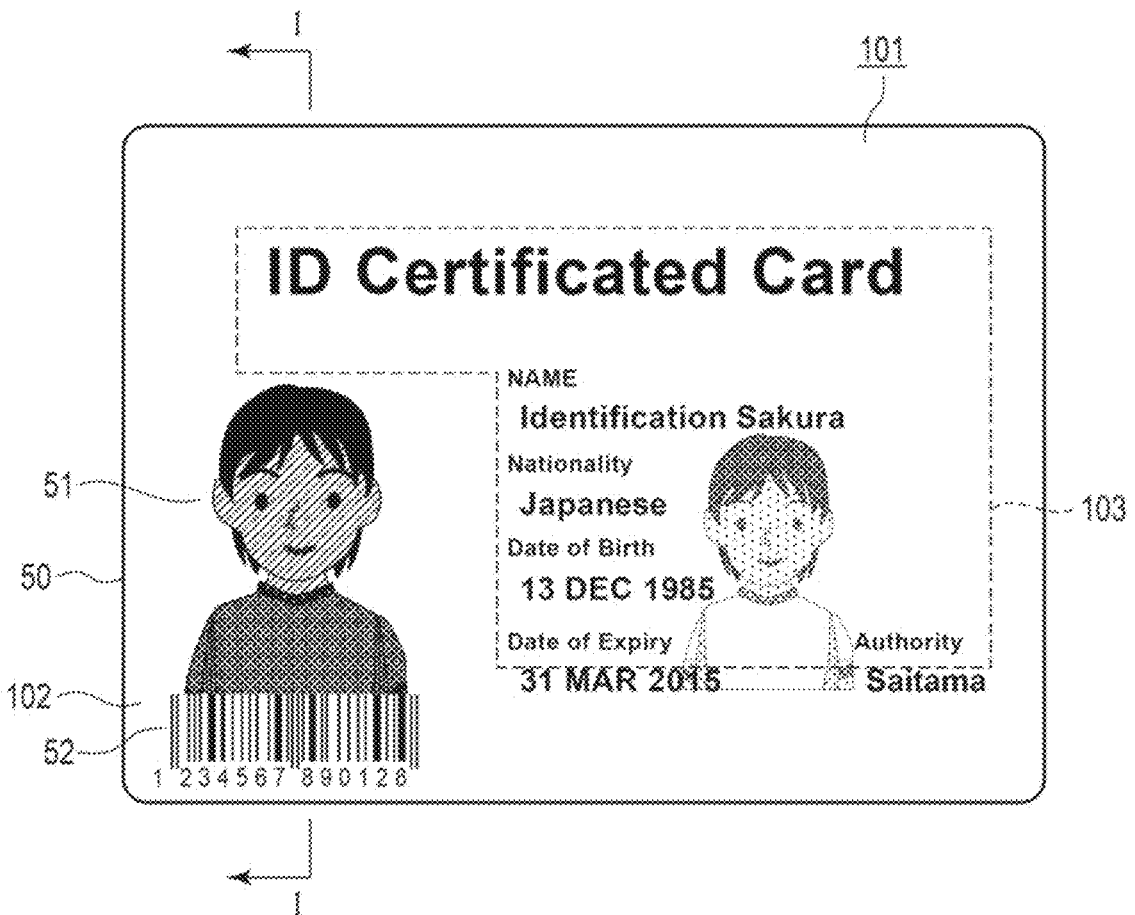
FIG. 8 is a plan view illustrating an example of an optical structure according to a third embodiment of the present invention.

FIG. 8 is a plan view illustrating an example of an optical structure according to the third embodiment of the present invention.

FIG. 8 illustrates a plan view of a card 101 as one example of the optical structure according to the present embodiment. The card 101 includes a first area 102 on which an individual information record 50 is formed by printing, and a second area 103 on which text and a face image are written by a laser beam.

In the first area 102, an identifier including a machine-readable code (for example, a bar code 52 that is readable by a bar code reader) is formed.

The text and face image of the second area 103 are visible. The text and face image of the second area 103 can be an identifier. The text and face image of the second area 103 can be individual information. The text and face image of the second area 103 can be card owner information.

In addition, the card 101 is applicable to one page of a booklet. Examples of the booklet are a passport booklet and a visa booklet.

Figure 9:
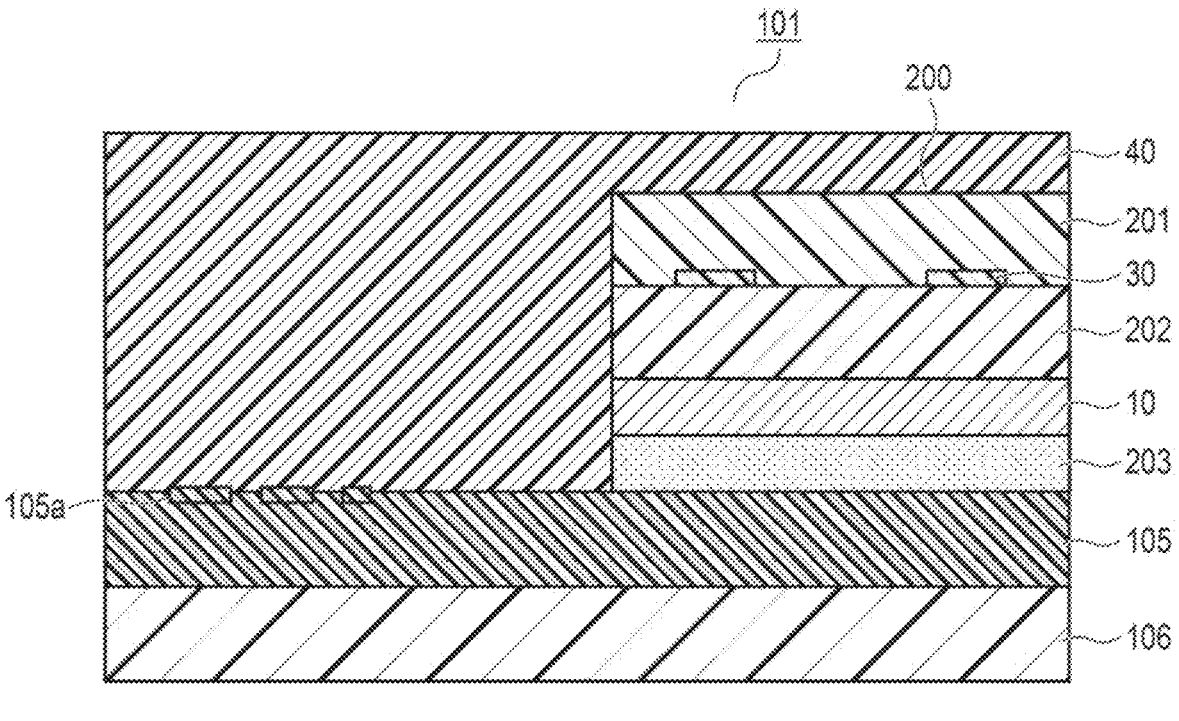
FIG. 9 is a schematic cross-sectional view for conceptually describing a cross-sectional configuration along line I-I in FIG. 8.

FIG. 9 is a schematic cross-sectional view for conceptually describing a cross-sectional configuration along line I-I in FIG. 8.

As illustrated in FIG. 9, the card 101 includes a spacer layer 105 in place of the spacer layer 20, on a white core layer 106. The material of the spacer layer 105 is a polymer including an aryl group, and a visible code can be written by irradiating a laser beam.

The polymer including the aryl group is the same as the polymer including the aryl group described in the first embodiment. Specifically, the spacer layer 105 is configured such that a visible code can be laser-written. The thickness of the spacer layer 105 is preferably 50 μm or more and 400 μm or less.

In the first area 102 of the card 101 illustrated in FIG. 8, as illustrated on a right side of FIG. 9, a transfer foil 200 including a print layer 30 is disposed between the spacer layer 105 and a protection layer 40. On the other hand, in the second area 103, as illustrated on a left side of FIG. 9, the protection layer 40 is disposed on the spacer layer 105, and the print layer 30 does not exist.

As illustrated in FIG. 9, the transfer foil 200 includes a peel layer 201; the print layer 30 formed under the peel layer 201; an emboss layer 202 formed under the print layer 30; a reflecting layer 10 formed under the emboss layer 202; and an adhesive layer 203 formed under the reflecting layer 10 and attached on the spacer layer 105.

The adhesive layer 203 has an upper surface adhered to the reflecting layer 10 and has a lower surface adhered to the spacer layer 105.

Note that an anchor layer (not illustrated) may be included in an arbitrary place between the print layer 30 and the adhesive layer 203. Further, a mask layer (not illustrated) may be included in an arbitrary place between the anchor layer and the print layer 30.

The emboss layer 202 is formed of a resin or the like, and can include an optical relief including fine recesses and projections on a surface on the adhesive layer 203 side. The relief structure of the emboss layer 202 is the same as the relief structure described in the first embodiment.

As described above, the adhesive layer 203 of the transfer foil 200 can be attached to the spacer layer 105, and, in this case, in the stack direction, the emboss layer 202 is disposed between the protection layer 40 and the print layer 30, and the peel layer 201 can be the protection layer 40.

Additionally, the adhesive layer 203 of the transfer foil 200 may be attached to the protection layer 40. In this case, in the stack direction, the emboss layer 202 is disposed between the spacer layer 105 and the print layer 30.

By the above configuration, the transfer foil 200 exhibits a predetermined optical effect of a hologram, a diffraction grating, or the like.

(Manufacturing Method of Card 101)

Next, a manufacturing method of the card 101 is described.

In order to manufacture the card 101, the transfer foil 200 is first fabricated.

The transfer foil 200 is formed by stacking, on a plastic film (not illustrated), the peel layer 201, print layer 30, emboss layer 202, reflecting layer 10 and adhesive layer 203 in the named order.

Next, the card 101 is formed. At a time of forming the card 101, the plastic film and transfer foil 200 are disposed on a card base member including the white core layer 106 and spacer layer 105, with the adhesive layer 203 facing the card base member.

After applying heat and pressure to the transfer foil 200 from above the plastic film, the plastic film is peeled, and thus the transfer foil 200 is bonded to the card base member.

Thereafter, the card base member and the transfer foil 200 are covered with a plastic film that becomes the protection layer 40, and laminated by applying heat and pressure, and thereby the card 101 including the first area 102 and second area 103 can be manufactured, as exemplarily illustrated in FIG. 8.

The peel layer 201 may be colored. The peel layer 201 can be colored by adding a pigment or dye to the resin of the peel layer 201. The pigment can be an inorganic pigment, an organic pigment, or a mixture of an inorganic pigment and an organic pigment. The pigment can be a single substance of a fluorescent pigment, a pearl pigment or a magnetic pigment, or a blend of the same kind, or a mixture of different kinds, or a mixture of different kinds of a blend of the same kind.

The dye can be a natural dye, a synthetic dye, or a mixture of a natural dye and a synthetic dye. The dye can also be a fluorescent dye.

The peel layer 201 can be formed by printing or coating on a plastic film. The coating can be a gravure coat, a micro gravure coat or a dye coat.

The printing can be gravure printing or screen printing. From the standpoint of processability, the thickness of the plastic film can be 10 μm or more and 50 μm or less. The thickness of the peel layer 201 is preferably 0.5 μm or more and 5 μm or less.

The peel layer 201 can receive the print layer 30. The peel layer 201 may include an acrylic resin as a main component. The acrylic resin can easily receive the print layer 30. An optical variable device (OVD)-equipped print body including the peel layer 201 that can receive the print layer 30 is printable as one piece.

In the card 101 immediately after manufacture, no information is written in the second area 103. By radiating a laser beam on the second area 103, the spacer layer 105 is carbonized to form a laser mark 105*a*, and the information (laser mark) 105*a* can be written.

The information written as the laser mark may be personal data, a biological identifier, or a code. An example of the biological identifier is a face image.

In the print layer 30 of the first area 102 of the card 101, like the print layer 30 of the first embodiment, the white level area RW and black level area RB can be formed. Thereby, the card 101 according to the present embodiment can have the same advantageous effect as the optical structure 1 according to the first embodiment.

Additionally, the security level can be further increased by combining the individual information record 50 written in the first area 102, and the information written in the second area 103, and, moreover, the optical effect exhibited by the transfer foil 200.

Besides, in the card 101, the print layer 30 on which the individual information record 50 is formed is covered with the protection layer 40, and falsification is difficult.

Note that the first area 102 in the present embodiment is not limited to the structure including the transfer foil 200. For example, in a case where the optical effect by the emboss layer 202 is not imparted to the first area 102, the print layer 30 may be formed only in the part that becomes the first area 102, and the identifier may be formed by the same procedure as in the first embodiment.

As has been described above, there can be provided an optical structure that is difficult to counterfeit and can form a code that compatibly achieves both a high readability and a fine appearance, and a manufacturing method thereof.

Fourth Embodiment

A fourth embodiment of the present invention is described with reference to FIG. 10. In the description below, structures common to those already described are denoted by identical reference signs, and an overlapping description is omitted.

Figure 10:
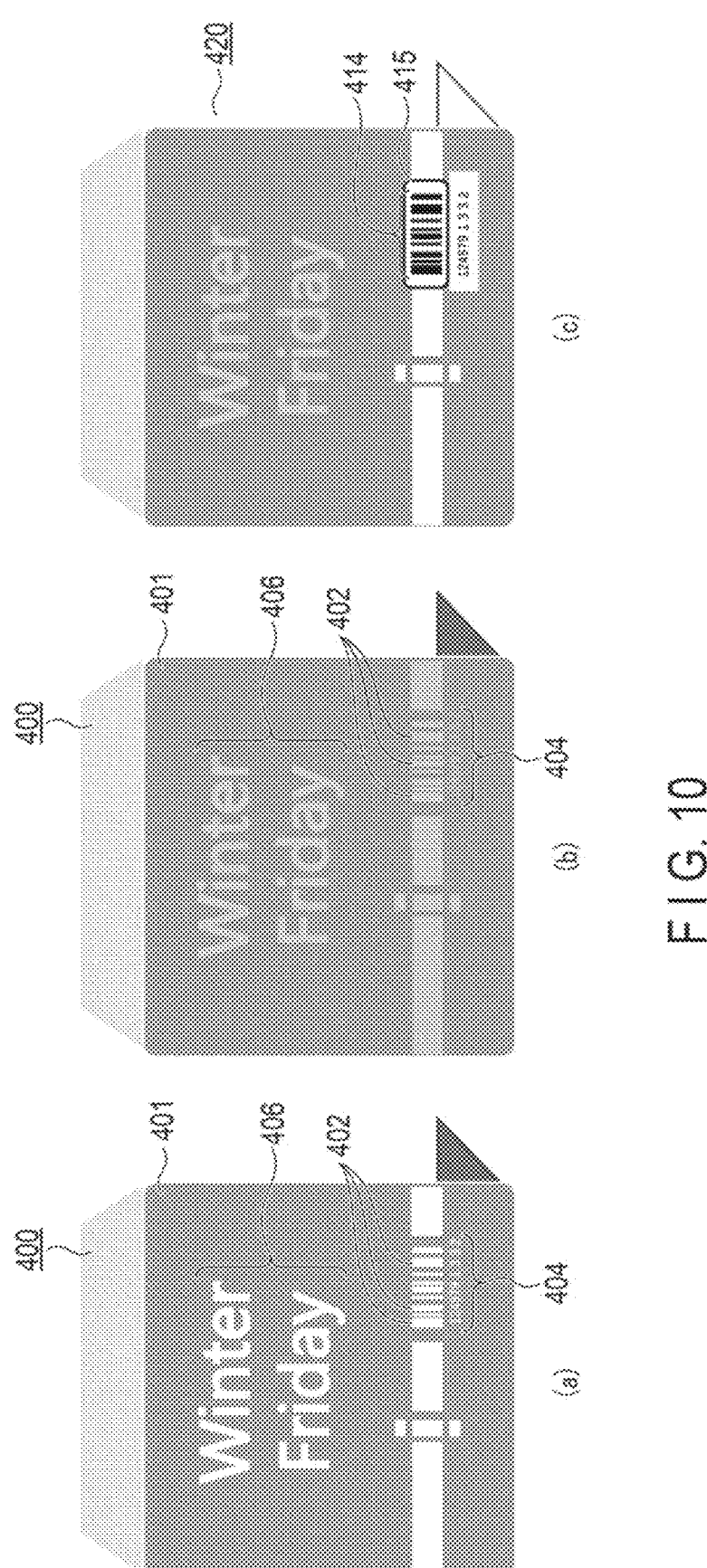
FIG. 10 is a plan view illustrating one applied example of an optical structure according to a fourth embodiment of the present invention.

FIG. 10 is a plan view illustrating one applied example of an optical structure according to the fourth embodiment of the present invention.

As illustrated in FIG. 10(*a*) and FIG. 10(*b*), an optical structure 400 according to the present embodiment includes a reflecting layer 401 having regular reflectivity, and a plurality of printed pale-color level areas 402 disposed on at least a part of the reflecting layer 401, and includes a machine-readable code such as a bar code 404, which is formed by a combination of the pale-color level areas 402.

FIG. 10(*a*) and FIG. 10(*b*) illustrate examples of an optical structure 400 in which a bar code 404 of pale colors such as white and pink is formed on a surface of a commodity, which is used as the reflecting layer 401, and FIG. 10(*c*) illustrates corresponding conventional art.

In the case of using the surface of the commodity as the reflecting layer 401, the surface of the commodity has gloss, for example, like a mirror-surface layer. The commodity with the surface usable as the reflecting layer 401 in this manner is, for example, a card for which metallized paper is used, a front sheet of a book, a wrapping label, and the like, although the examples are not limited to these.

Even if the bar code 404 is disposed on the reflecting layer 401 with gloss, a bar code formed in black cannot be read.

Thus, in the conventional art, as illustrated in FIG. 10(*c*), a seal 415, on which a bar code 414 of an Indian ink color, that is, a black color, is printed, is attached to a commodity 420. However, in this case, since unnaturalness occurs in regard to the external appearance or design, there is concern that the brand image of the commodity 420 is damaged.

However, in the case of the bar code 404 formed in white or a pale color, the bar code 404 can be read. Thus, in the optical structure according to the present embodiment, the bar code 404 is formed by combining the pale-color level areas 402.

As the color of the pale-color level areas 402 forming the bar code 404, white is suitable, as exemplarily illustrated in FIG. 10(*a*). In addition, pink is possible, as exemplarily illustrated in FIG. 10(*b*). In this manner, by forming the bar code 404 in a pale color such as white or pink, the code information of the bar code 404 can be read from even the surface with gloss.

In addition, in particular, the examples illustrate in FIG. 10(*a*) and FIG. 10(*b*) are examples in which the bar code 404 is formed with the same color as an underlying print 406 of the design of the commodity.

As is understood by viewing FIG. 10(*a*) and FIG. 10(*b*), such a bar code 404 appears as being integral with the design of the commodity, and there is no unnaturalness due to the print of the bar code 404, and thus the brand image of the commodity is not damaged.

As has been described above, according to the present embodiment, there can be provided an optical structure with a bar code that can be read even when disposed on a glossy surface and is preferably formed in white or a pale color that is used for a commodity so as not to cause unnaturalness in regard to an external appearance or design, and a manufacturing method thereof.

Fifth Embodiment

A fifth embodiment of the present invention is described.

For example, in a Christmas selling season, liquors such as champagne are wrapped in packages of silver glossy metallized paper and sold. As described also in the fourth embodiment, even if a black bar code is printed on glossy metallized paper, the information of the bar code cannot be read.

Thus, conventionally, as described in the fourth embodiment with reference to FIG. 10(*c*), the seal 415, on which the bar code 414 of the Indian ink color, that is, the black color, is printed, is attached to a package.

However, the work of attaching the seal 415 is usually carried out by manual work, the work load increases. In addition, because of the manual work, there is concern of non-uniform attachment, and, in such a case, the appearance becomes poor.

In addition, for example, as regards a Christmas commodity, if the seal 415, on which the bar code 414 of the Indian ink color (black) is printed, is attached to a package whose base color is white, green and red, the impression of the Christmas commodity is considerably damaged.

Furthermore, since the work of attaching the seal 415 is a different work from the printing process, there is concern that many minor corrections will occur due to forgetting to attach the seal 415 at the time of manufacturing commodities.

The optical structure according to the present embodiment can solve such problems.

The optical structure according to the fifth embodiment of the present invention is described with reference to FIG. 11. In the description below, structures common to those already described are denoted by identical reference signs, and an overlapping description is omitted.

Figure 11:
FIG. 11 is a perspective view illustrating an applied example of an optical structure according to a fifth embodiment of the present invention.

FIG. 11 is a perspective view illustrating an applied example of the optical structure according to the fifth embodiment of the present invention.

An optical structure 500 illustrated in FIG. 11 is an example of an implementation with use of a package of a liquor such as champagne.

The optical structure 500 includes a machine-readable code such as a bar code 503, which is formed by utilizing a ground color of a product 501 that is a package, and a color of a background of a label 502 covering the product 501.

The bar code 503 is formed by a combination of a plurality of pale-color level areas 504 formed of one of the ground color of the product 501 and the color of the background of the label 502, and a plurality of non-palecolor level areas 505 formed of the other of the ground color of the product 501 and the color of the background of the label 502.

In the example illustrated in FIG. 11, the product 501 is a package of a silver color that is put on a bottle of a liquor such as champagne. The label 502 is formed of a light-shielding barrier film laminated on the product 501, and includes a white background.

The bar code 503 is not formed by a white print, but is formed, without using an Indian ink color, by using the silver ground color as the non-pale-color level area 505 and using the background of the label as the pale-color level area 504.

In this manner, the bar code 503 is formed on the product 501 by utilizing the ground color of the product 501 that is the package, and the color of the background of the label 502 that covers the product 501.

Since the bar code 503 is machine-readable even if the product 501 has gloss, there is no need to attach to the product 501 the seal 415 on which the bar code 414 of an Indian ink color, or a black color, is printed.

In this manner, without spoiling the atmosphere of Christmas, the machine-readable bar code 503 can surely be provided on the product 501.

According to this optical structure 500 of the present embodiment, the following function and effect can be obtained.

As has been described above, according to the present embodiment, there can be obtained an optical structure that can form a code readable even from a glossy surface, and a manufacturing method thereof.

Next, examples of the optical structure of the present invention are further described with use of comparative examples. In the description below, the term "parts" means "parts by mass", unless otherwise described.

Example 1

Example 1 corresponds to the first embodiment, and the optical structure 1, as illustrated in FIG. 1, includes the reflecting layer 10 and print layer 30.

The materials of the reflecting layer 10 and print layer 30 in the optical structure 1 of Example 1 are as follows.

Reflecting layer 10: aluminum evaporation film (PET, thickness: 28 μm, Al evaporation), and Print layer 30: white inorganic pigment (weight ratio 1:5=titanium oxide: ink solvent, Toyo Ink SS8-000).
(Fabrication of Optical Structure 1)

Figure 12:
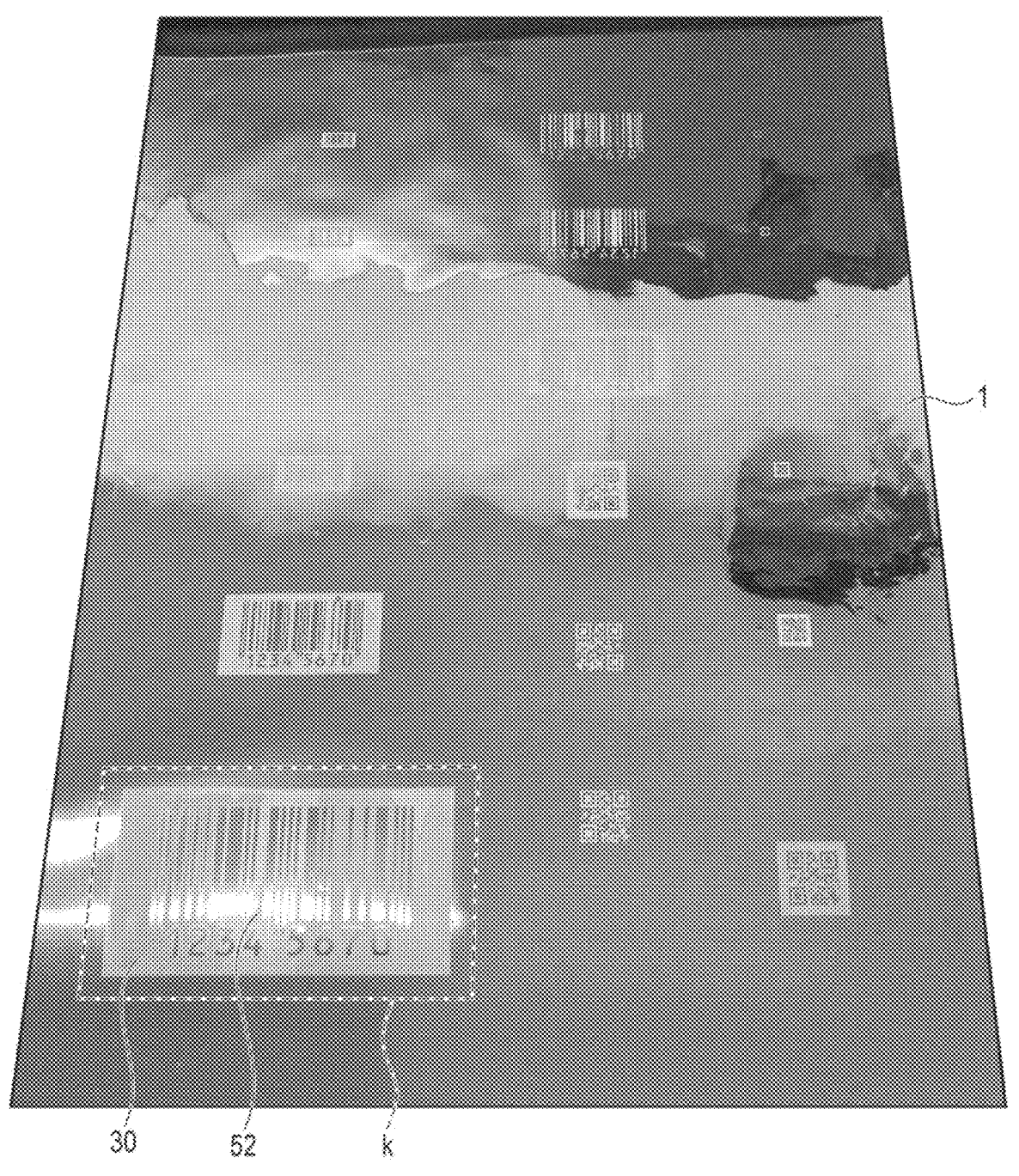
FIG. 12 is a top view illustrating an optical structure fabricated in Example 1 of the present invention.

FIG. 12 is a top view illustrating an optical structure fabricated in Example 1 of the present invention.

In order to fabricate an optical structure 1, a white inorganic pigment (titanium oxide) that becomes a print layer 30 is transferred on a reflecting layer 10 by screen printing with a thickness of 50 μm, and dried, and a scattering reflecting layer was formed. Thus, as illustrated in FIG. 12, the optical structure 1 of Example 1 including the print layer 30 on the reflecting layer 10 was successfully fabricated.

In the optical structure 1 illustrated in FIG. 12, a bar code 52 printed on the print layer 30 as indicated by an area K was scanned by a reader.

Figure 13:
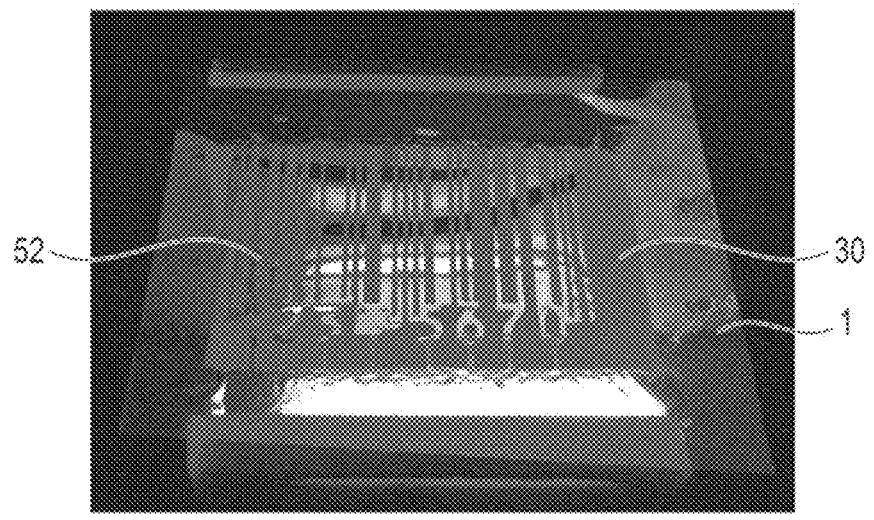
FIG. 13 is a view illustrating a scan result of a bar code 52.
Figure 14:
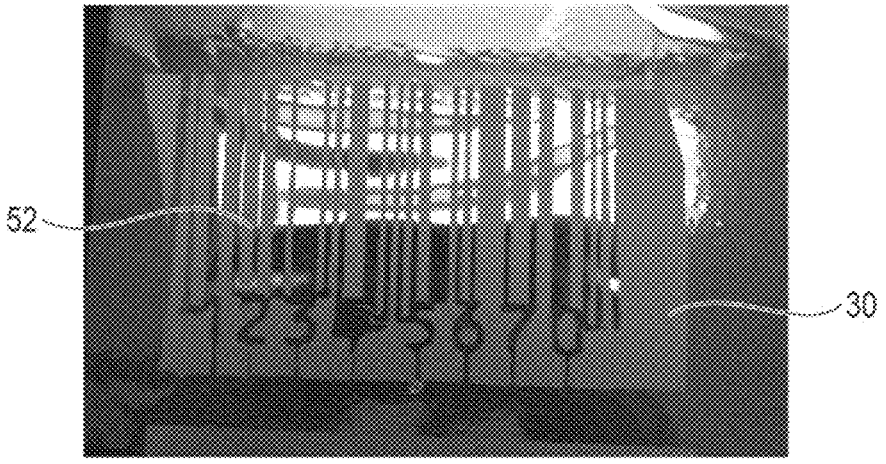
FIG. 14 is a view illustrating a scan result of the bar code 52.

FIG. 13 and FIG. 14 are views illustrating scan results of the bar code 52. In FIG. 13 and FIG. 14, the viewing angle from the reader is different. FIG. 13 illustrates a result of scanning the bar code 52 by the reader from an oblique direction, and FIG. 14 illustrates a result of scanning the bar code 52 by the reader from a substantially frontal direction.

From the scan results exemplarily illustrated in FIG. 13 and FIG. 14, it was understood that information can be acquired if the bar code 52 is scanned with an inclination of 20° or more and 80° or less of the reader from the normal line of the structure surface.

Example 2

In Example 2, an optical structure 1 having the same configuration as in Example 1 was fabricated by using, as the material of the print layer 30, a titanium oxide pigment-containing white ink (weight ratio 1:25, $TiO_2$: SSS WAC varnish (acrylic resin)=1 g: 25 g parts by weight ($TiO_2$ is 3% in ink)).

Codes were formed by metal evaporation on the print layer 30 formed of a white ink. A QR code was relatively poor in readability, but was readable. A bar code was readable with no problem. It is considered that the bar code may be readable even if the metal evaporation is transparent evaporation.

Here, considering that the solid content ratio of the SSS WAC varnish is 15 to 25%, it is considered that, in terms of the solid content ratio, the readable range is $TiO_2$: medium=1 g: 3.75~6.25 g.

The best modes for carrying out the present invention have been described above with reference to the accompanying drawings. However, the range of the present disclosure is not limited to the illustrated and described embodiments, and can include all embodiments that can have advantageous effects equivalent to those aimed at by the present invention. Furthermore, the range of the present disclosure is not limited to the features of the invention defined by the claims, and includes all disclosed features, and any combination of the features.

For example, as illustrated in a cross-sectional view of FIG. 15, two optical structures according to freely selected embodiments are bonded, with their reflecting layers 10 facing each other, and thereby an optical structure 301 including individual information records 50A on both sides can be formed.

In particular, although FIG. 15 illustrates the example in which an optical structure 1A and an optical structure 1B having the same configuration are bonded, the configurations of the bonded optical structures may be different.

Additionally, the identifier is not limited to the above-described bar code 52, and may be, for example, a two-dimensional code or the like.

The terms "part", "element", "pixel", "cell", "segment", "unit", "display body" and "article" used in the present disclosure are physical entities. The physical entity can refer to a physical mode, or a spatial mode surrounded by a substance. The physical entity can be a structure. The structure can include a specific function. A combination of structures having specific functions can exhibit a synergetic effect by a combination of the functions of the structures.

Additionally, the terms used in the present disclosure and, in particular, in the attached claims (for example, the main text of the attached claims) are generally intended as "open" terms (for example, the term "having" should be interpreted as "having at least", and the term "including" should be interpreted as "including, but not limited thereto").

Additionally, in a case of interpreting a term, a structure, a feature, a mode and an embodiment, drawings should be referred to, where necessary. A matter derived directly and uniquely from a drawing should be a basis of amendment, like text.

In a case where a description of a claim, in which a specific number is introduced, is intended, such an intention is explicitly described in the claim, and if such a description is not present, such an intention does not exist. For example, in order to help understanding, the attached claims include the use of introductory phrases of "at least one" and "one or a plurality of", and can introduce a recitation of claims. However, the use of such a phrase should not be interpreted to mean a limitation to an embodiment including only one such description.

A phrase at a beginning, "one or more" or "at least one", should be interpreted to mean "one" or "one or more". The same applies to the use of a definite article that is used in order to introduce a description of a claim.

REFERENCE SIGNS LIST 1, 2 Optical structure
2A, 2B Optical structure (pre-structure)
10 Reflecting layer
15 Emboss layer
20 Spacer layer
30 Print layer
40 Protection layer
50 Individual information record
51 Visible code
52 Bar code
101 Card
102 First area
103 Second area
105 Spacer layer
106 White core layer
200 Transfer foil
201 Peel layer
202 Emboss layer
203 Adhesive layer
301 Optical structure
400 Optical structure
401 Reflecting layer
402 Pale-color level area
404 Bar code
406 Underlying print
414 Bar code
415 Seal
420 Commodity
500 Optical structure
501 Product
502 Label
503 Bar code
504 Pale-color level area

The invention claimed is:

1. An optical structure comprising:
a reflecting layer having regular reflectivity;
a print layer stacked on at least a part of the reflecting layer, the print layer functioning as a scattering reflector having scattering reflectivity;
a spacer layer having light-transmissivity or transparency between the print layer and the reflecting layer; and
an emboss layer including a recess-and-projection structure, between the spacer layer and the reflecting layer, or between the spacer layer and the print layer,
wherein
an image part, which is recognizable when viewed from a stack direction, is formed on the print layer, the image part includes a plurality of pale-color level areas that is printed, and a non-pale-color level area interposed between the plurality of pale-color level areas.

2. The optical structure of claim 1, further comprising a protection layer having light-transmissivity or transparency, the protection layer covering the print layer.

3. The optical structure of claim 1, wherein the non-pale-color level area is a black level area.

4. The optical structure of claim 1, wherein a machine-readable code formed by a combination of the plurality of pale-color level areas is disposed.

5. The optical structure of claim 4, wherein the reflecting layer is a mirror-surface layer.

6. The optical structure of claim 5, wherein the reflecting layer is an evaporation layer.

7. The optical structure of claim 1, wherein a pale-color level area among the plurality of pale-color level areas is a white level area.

8. A bonded optical structure comprising:
a first optical structure including,
a first reflecting layer having regular reflectivity,
a print layer stacked on at least a part of the first reflecting layer, the print layer functioning as a scattering reflector having scattering reflectivity,
a spacer layer having light-transmissivity or transparency between the print layer and the first reflecting layer, and
an emboss layer including a recess-and-projection structure, between the spacer layer and the first reflecting layer, or between the spacer layer and the print layer,
wherein
an image part, which is recognizable when viewed from a stack direction, is formed on the print layer,
the image part includes a plurality of pale-color level areas that is printed, and a non-pale-color level area interposed between the plurality of pale-color level areas; and
a second optical structure including,
a second reflecting layer having regular reflectivity,
a print layer stacked on at least a part of the second reflecting layer, the print layer functioning as a scattering reflector having scattering reflectivity,
a spacer layer having light-transmissivity or transparency between the print layer and the second reflecting layer, and
an emboss layer including a recess-and-projection structure, between the spacer layer and the second reflecting layer, or between the spacer layer and the print layer,
wherein
an image part, which is recognizable when viewed from a stack direction, is formed on the print layer,
the image part includes a plurality of pale-color level areas that is printed, and a non-pale-color level area interposed between the plurality of pale-color level areas
wherein the first optical structure and the second optical structure are bonded as the bonded optical structure with the first reflecting layer of the first optical structure and the second reflecting layer of the second optical structure facing each other.

9. The bonded optical structure of claim 8, wherein the non-pale-color level area is a black level area.

* * * * *